United States Patent
Lim et al.

(10) Patent No.: US 6,822,815 B2
(45) Date of Patent: Nov. 23, 2004

(54) ABNORMAL MAGNETORESISTIVE ELEMENT DETECTION FOR A DISC DRIVE

(75) Inventors: Eng Hock Lim, Singapore (SG); Khai Sheng Ng, Singapore (SG); Fong Kheon Chong, Singapore (SG); Chew Weng Khin Victor, Singapore (SG); Myint Ngwe, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 301 days.

(21) Appl. No.: 10/186,961

(22) Filed: Jun. 28, 2002

(65) Prior Publication Data
US 2003/0169528 A1 Sep. 11, 2003

Related U.S. Application Data
(60) Provisional application No. 60/362,910, filed on Mar. 8, 2002.

(51) Int. Cl.[7] .............................................. G11B 27/36
(52) U.S. Cl. ............................ 360/31; 360/66; 324/212
(58) Field of Search ........................... 360/31, 66, 313, 360/323, 61, 46, 67; 324/210, 212, 226, 252

(56) References Cited

U.S. PATENT DOCUMENTS

| | | | |
|---|---|---|---|
| 6,150,876 A | 11/2000 | Ngo | |
| 6,225,801 B1 | 5/2001 | Jin et al. | |
| 6,226,137 B1 | 5/2001 | Ngo | |
| 6,275,347 B1 | 8/2001 | Ngo et al. | |
| 6,359,433 B1 * | 3/2002 | Gillis et al. | 324/210 |
| 6,400,534 B1 * | 6/2002 | Klaassen | 360/323 |
| 6,473,255 B2 * | 10/2002 | Hatanaka et al. | 360/51 |
| 6,667,614 B1 * | 12/2003 | McMahon et al. | 324/212 |
| 2003/0053239 A1 * | 3/2003 | Jiang | 360/66 |

* cited by examiner

*Primary Examiner*—Alan T. Faber
(74) *Attorney, Agent, or Firm*—Fellers, Snider, et al.

(57) ABSTRACT

A magnetoresistive element measurement circuit configured for measuring resistance of a magnetoresistive element biased by a current source is disclosed. In a preferred embodiment, the measurement circuit includes the magnetoresistive element, a current source providing a fixed current to the magnetoresistive element, at least one current bypass switch controllingly engaging a measurement resistor in an electrical parallel configuration with the biased magnetoresistive element, and an analogue voltage detector measuring voltage first across the biased magnetoresistive element and then across the biased magnetoresistive element in electrical parallel communication with the measurement resistor. The measured voltages are factored with the measurement resistor to determine the resistance of the magnetoresistive element. The determined resistance is compared to a resistance range, if within the range the magnetoresistive element is in an operative state, if outside the range the magnetoresistive element is in a non-operative state.

19 Claims, 2 Drawing Sheets

ABNORMAL MAGNETORESISTIVE ELEMENT DETECTION FOR A DISC DRIVE

RELATED APPLICATIONS

This application claims priority to U.S. Provisional Application No. 60/362,910 filed Mar. 8, 2002, entitled MR Resistance Measurement By Dummy Resistor Method For Hard Disc Drive.

FIELD OF THE INVENTION

This invention relates generally to the field of magnetic data storage devices, and more particularly, but not by way of limitation, to abnormal magnetoresistive element detection for a disc drive.

BACKGROUND

Disc drives are used for data storage in modern electronic products ranging from digital cameras to computers and network systems. Typically a disc drive includes a mechanical portion and an electronics portion in the form of a printed circuit board assembly that controls functions of the mechanical portion while providing a communication interface to a host being serviced by the disc drive.

Typically, the mechanical portion, or head-disc assembly, has a disc with a recording surface rotated at a constant speed by a spindle motor assembly and an actuator assembly positionably controlled by a closed loop servo system for use in accessing the stored data. The actuator assembly commonly supports a magnetoresistive read/write head that writes data to and reads data from the recording surface. Normally, the magnetoresistive read/write head uses an inductive element, or writer, to write data to and a magnetoresistive element, or reader, to read data from the recording surface.

The disc drive market continues to place pressure on the industry for disc drives with increased capacities, higher data rates and lower costs. A key aspect of achieving lower costs is an identification of marginal components as early as practical in the manufacturing process to preclude needless accrual of additional manufacturing costs and costly rework operations in subsequent processes.

A critical component of a disc drive is the magnetoresistive read/write head. As each read/write head passes through manufacturing processes in preparation for use in a disc drive, costs associated with those processes accrue and contribute to the overall cost of the disc drive. By measuring characteristics of the read/write head throughout the manufacturing process, defective and marginal read/write heads can be culled from the process before additional costs are needlessly applied.

One such characteristic of concern is the resistance of the magnetoresistive element relative to a range of acceptable resistance values. High or low magnetoresistive element resistance values, which are not within the range, are considered defective. High resistance can indicate a discontinuity in the magnetoresistive element, caused by electrical overstress or electrostatic discharge. Low resistance could cause high current surge into the transducer, and lead to electrical overstress.

Read/write head testing methodologies such as RHBUFF (Read Head Buffered) and DBHV (Digital Buffer Head Voltage) method have been employed to cull substandard read/write heads from the process. However, in application each methodology has shortcomings.

The RHBUFF methodology requires extensive modifications to the pre-amplifier and special bias circuits, which lower the noise contribution from the bias circuits to the test results. During testing, a substantially noise free bias current is applied to the MR element and a mid-range frequency response of the MR element is monitored. Correlation between the test results of the RHBUFF methodology and actual performance of the read/write head in a disc drive environment is tentative.

The DBHV method utilizes a comparator, typically incorporated within the application specific integrated circuit ASIC of the disc drive, for comparing a measured voltage across the magnetoresistive element to a pre-set trip voltage. Do to a quantization error inherent in the measurement method, a problem of inaccuracy arises with use of the DBHV method. Typically, the 7-bit setting in the voltage allows the stepping of roughly 6 mV, causing the quantization loss.

As such, challenges remain and a need persists for effective techniques for identifying, testing and predicting operating characteristics of read/write heads throughout the disc drive manufacturing process. It is to this and other features and advantages set forth herein that embodiments of the present invention are directed.

SUMMARY OF THE INVENTION

As exemplified by preferred embodiments, the present invention provides a magnetoresistive element measurement circuit configured for measuring resistance of a magnetoresistive element biased by a current source is disclosed. In a preferred embodiment, the magnetoresistive element measurement circuit includes the magnetoresistive element. A current source provides a fixed current that biases the magnetoresistive element. Upon activation of at least one current bypass switch within the circuit, a measurement resistor communicates with the biased magnetoresistive element in an electrical parallel configuration. The fixed current splits and flows through the measurement resistor while continuing to bias the magnetoresistive element. Included in the measurement circuit is an analogue voltage detector that first measures the voltage across the biased magnetoresistive element with the measurement resistor switched out of the circuit and then measures the voltage of the circuit with the measurement circuit switched in the circuit. Each of the measured voltages in combination with the measurement resistor are factored together to determine the resistance of the magnetoresistive element. The determined resistance of the magnetoresistive element is compared to a resistance range, if the determined resistance is within the range the magnetoresistive element is in an operative state. However, if the determined resistance is outside the range the magnetoresistive element is in a non-operative state. These and various other features and advantages, which characterize the present invention, will be apparent from a reading of the following detailed description and a review of the associated drawings.

DETAILED DESCRIPTION

Figure 1:
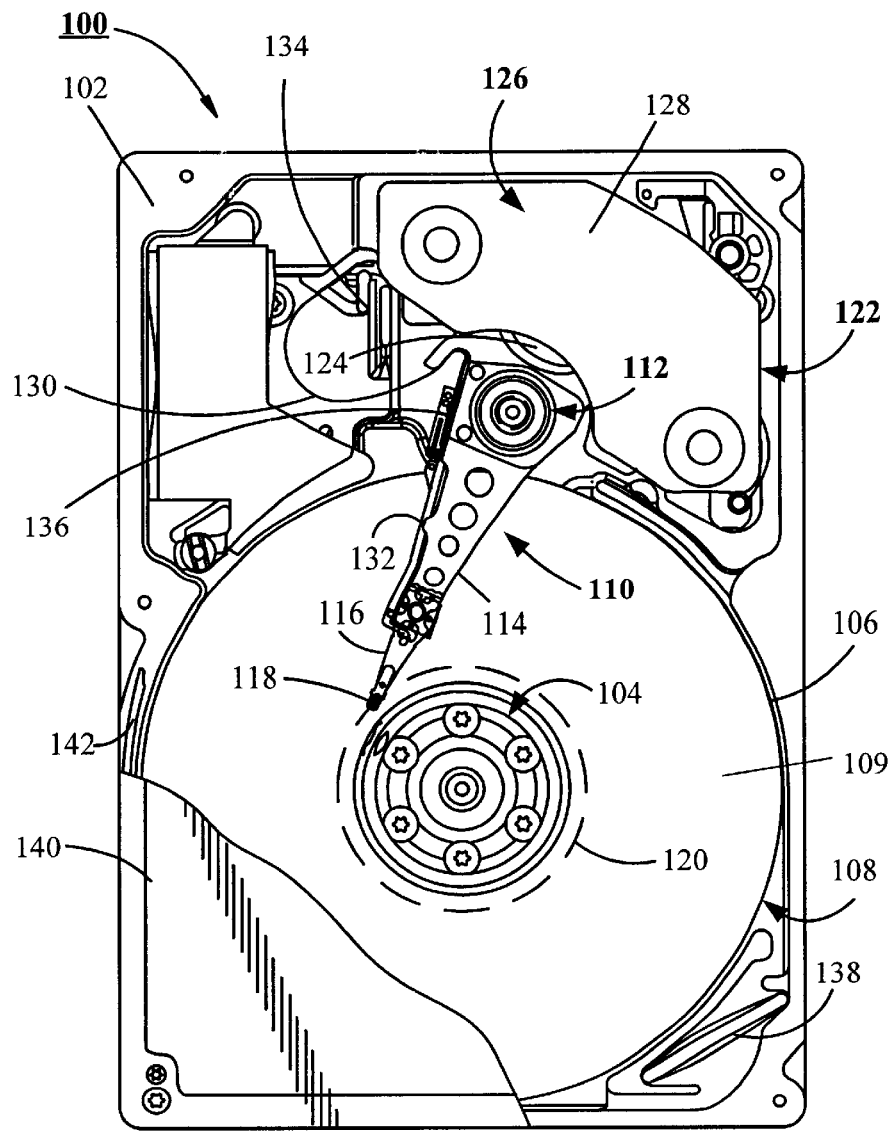
FIG. 1 is a top plan view of a disc drive that incorporates a read/write with a magnetoresistive element confirmed to be within a predetermined threshold range.

Referring to the drawings in general, and more particularly to FIG. 1, shown therein is a top view of a disc drive 100, also referred to herein as a data storage device, constructed in accordance with the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack assembly 108, each disc 106 having at least one, and usually two, recording surfaces 109.

Adjacent the disc stack assembly 108 is a head stack assembly 110 (also referred to as an actuator assembly) that pivots about a bearing assembly 112 in a rotary fashion. The actuator assembly 110 includes an actuator arm 114 that supports a load arm 116, which in turn supports a read/write head 118 corresponding to the rotatable recording surface 109. The rotatable recording surface 109 is divided into concentric information tracks 120 (only one depicted) over which the read/write head 118 is positionably located. The information tracks 120 accommodate head position control information written to embedded servo sectors (not separately depicted). Between the embedded servo sectors are data sectors used for storing data in the form of bit patterns. The read/write head 118 includes a reader element (not separately shown) offset radially and laterally from a writer element (not separately shown). The writer element writes data to the concentric information tracks 120 while the reader element controls the positioning of the read/write head 118 relative to the concentric information tracks 120 during write operations. During read operations the reader element reads data from the concentric information tracks 120 for passage to a host (not shown) serviced by the disc drive 100 and for use by a servo control system.

The term "servoing" or "position-controlling," as used herein, means maintaining control of the read/write head 118 relative to the rotating recording surface 109 during operation of the disc drive 100. When servoing to or servoing on a selected information track 120, the actuator assembly 110 is controllably positioned by a voice coil motor assembly 122. The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor assembly 122. During operation of the disc drive 100, current passes through the actuator coil 124 forming an electromagnetic field, which interacts with the magnetic circuit of the voice coil motor assembly 122, causing the actuator coil 124 to move relative to the magnet assembly 126. As the actuator coil 124 moves, the actuator assembly 110 pivots about the bearing assembly 112, causing the read/write head 118 to move over the rotatable recording surface 109, thereby allowing the read/write head 118 to interact with the information tracks 120 of the recording surface 109.

To provide the requisite electrical conduction paths between the read/write head 118 and read/write circuitry of the disc drive (not shown), read/write head wires (not shown) affixed to the read/write head 118 are attached to a read/write flex circuit 130. The read/write flex circuit 130 is routed from the load arm 116 along the actuator arm 114 and into a flex circuit containment channel 132 and secured to a flex connector body 134. The flex connector body 134 supports the flex circuit 130 during passage through the basedeck 102 and into electrical communication with a printed circuit board assembly (PCBA) (not shown) typically mounted to the underside of the basedeck 102.

The flex circuit containment channel 132 also supports read/write signal circuitry including a preamplifier/driver (preamp) 136 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

To assure a continually clean interior operating environment, a hepa filter 138 is provided to extract particles from the interior operating environment while the disc drive 100 is in an operating mode. To preclude migration of particles into the interior operating environment, a top cover 140 compresses a gasket 142 against the basedeck 102 to form a hermetic seal between the interior environment of the disc drive 100 and the environment exterior to the disc drive 100.

Figure 2:
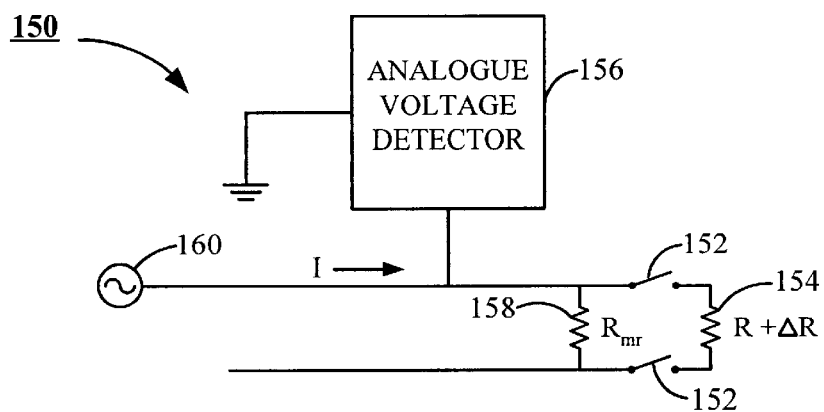
FIG. 2 is a circuit diagram of an embodiment of a measurement circuit used to confirm the resistance of the magnetoresistive element of the disc drive of FIG. 1 to be within the predetermined threshold range.

In a preferred embodiment of a magnetoresistive element measurement circuit (measurement circuit) 150 of FIG. 2, a pair of bias current bypass switches 152, switch in and out a measurement resistor 154 of the measurement circuit 150 while voltage measurements are taken. An analogue voltage detector 156, first measures the voltage across a biased magnetoresistive element 158, with the measurement resistor 154 switched out of the measurement circuit 150 and then measures the voltage across the biased magnetoresistive element 158 with the measurement resistor switched in to the measurement circuit 150. With the measurement resistor 154 switched in the measurement resistor 154 and the biased magnetoresistive element 158 appear as resistors in parallel to a bias current source 160.

Each of the measured voltages in combination with the measurement resistor 154 are factored together to determine a resistance of the biased magnetoresistive element 158. The determined resistance of the biased magnetoresistive element 158 is compared to limits of a resistance threshold, if the determined resistance is within the limits, the biased magnetoresistive element 158 is in an operative state. However, if the determined resistance is outside the limits, the biased magnetoresistive element 158 is in a non-operative state.

In a preferred embodiment, resistance of the biased magnetoresistive element 158 is made through use of a "dummy resistance" method utilizing the measurement circuit 150. Within the measurement circuit 150, the resistance of the biased magnetoresistive element 158 is represented by the resistor $R_{mr}$ while the resistance of the measurement resistor 154 is represented by R. ΔR represents the variation of the measurement resistor 154. The two bias current bypass switches 152 are designed to selectable switch in or out the measurement resistor 154 during a voltage measurement procedure. The analogue voltage detector 156 is used to measure an absolute voltage value when applying an external fixed current I, typically in a range of 1 or 2 mA, via the bias current source 160.

In determining a resistance of the biased magnetoresistive element 158 each bias current bypass switch 152 is selected and placed in an open state in preparation for a first measurement of voltage $V_1$, which is expressed as:

$$V_1 = IR_{mr} \qquad \text{Equation (1)}$$

Next, each bias current bypass switch 152 is selected and placed in a closed state in preparation for a first measurement of a second voltage $V_2$, which is expressed as:

$$V_2 = I \frac{R_{mr}(R+\Delta R)}{R+\Delta R+R_{mr}} \qquad \text{Equation (2)}$$

where $$\frac{R_{mr}(R+\Delta R)}{R+\Delta R+R_{mr}} = R_{mr} \| (R+\Delta R)$$

is the effect of $R_{mr}$ when going parallel with R.

Taking the ratio $\kappa$ of equation (2) and (1), equation 3 is obtained and expressed in the form of:

$$\kappa = \frac{V_2}{V_1} = \frac{(R+\Delta R)}{R+\Delta R+R_{mr}} \qquad \text{Equation (3)}$$

It is noted that the term $IR_{mr}$ is cancelled off.

The ratio $\kappa$ has removed the variation in the measurements of $V_1$ and $V_2$. It cancels off the inaccuracy caused by the fixed current I. Thus, $R_{mr}$ can be calculated as:

$$R_{mr} = \left(\frac{1}{\kappa} - 1\right)(R+\Delta R) = \left(\frac{1}{\kappa} - 1\right)R + \left(\frac{1}{\kappa} - 1\right)\Delta R \qquad \text{Equation (4)}$$

It is seen from equation (4) that the variation in the resistance of the magnetoresistive element is defined as:

$$\Delta R_{mr} = \qquad \text{Equation (5)}$$
$$\left(\frac{1}{\kappa} - 1\right)\Delta R \Rightarrow \left(\text{or } \lim_{\Delta R \to 0} \frac{\Delta R_{mr}}{\Delta R} = \frac{\partial R_{mr}}{\partial R} = \frac{1}{\kappa} - 1\right)$$

Utilizing the measurement method of the present invention, the resistance of the biased magnetoresistive element 158 can be calculated from equation (4) and its error is defined in equation (5).

In a preferred embodiment, the measurement resistor 154 is presented in a semiconductor form and in an external discrete component form for an alternate preferred embodiment. The voltages $V_2$ and $V_1$ are actual values measured by the means of an analogue voltage detector 156. The analogue voltage detector 156 is contained within the preamp 136 (FIG. 1).

By knowing R, $V_1$, and $V_2$, the resistance $R_{mr}$ of the biased magnetoresistive element 158 can easily be determined by equation (4) (by assuming $\Delta R=0$). The accuracy of the measured $\Delta R_{mr}$ can also be calculated by application of equation (5), and it's value is totally dependent on $\Delta R$.

Figure 3:
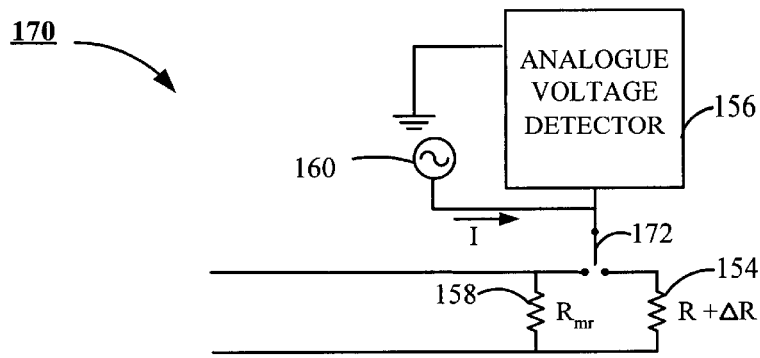
FIG. 3 is a circuit diagram of an alternate embodiment of a measurement circuit used to confirm the resistance of the magnetoresistive element of the disc drive of FIG. 1 to be within the predetermined threshold range.

Magnetoresistive element measurement circuit (measurement circuit) 170 shown by FIG. 3 is an alternate preferred embodiment of the present invention. A primary difference between measurement circuit 170 and measurement circuit 150 (FIG. 2) is the presence of a single bias current bypass switch 172. The remaining components of the measurement circuit 170 are common to measurement circuit 150.

Using the architecture of the measurement circuit 170, $V_1$ in the form of $V_1 = IR_{mr}$ and $V_2$ in the form of $V_2 = I(R+\Delta R)$, when toggling the bias current bypass switch 172, are utilized in determining the resistance of the biased magnetoresistive element 158. That is (with fixed current I):

$$\kappa = \frac{V_2}{V_1} = \frac{(R+\Delta R)}{R_{mr}} \Rightarrow R_{mr} = \frac{R}{\kappa} + \frac{\Delta R}{\kappa} \qquad \text{Equation (6)}$$

where the variation is given by:

$$\Delta R_{mr} = \frac{\Delta R}{\kappa}.$$

In each embodiment of the measurement circuit, 150 and 170, a preference has been found for a resistance value of 1000 Ohms for the measurement resistor 154.

It will be understood that the values provided within the present description are values applicable to a particular biased magnetoresistive element 158 configuration and do not impose limitations on the present invention. The values given serve to enhance the understanding of the present invention. When practicing the present invention it will be understood that a test regimen may include a variety of bias current levels to gain a more complete perspective of a present "health" and future predicted performance of the particular biased magnetoresistive element 158 over the operating life of the particular biased magnetoresistive element 158.

Figure 4:
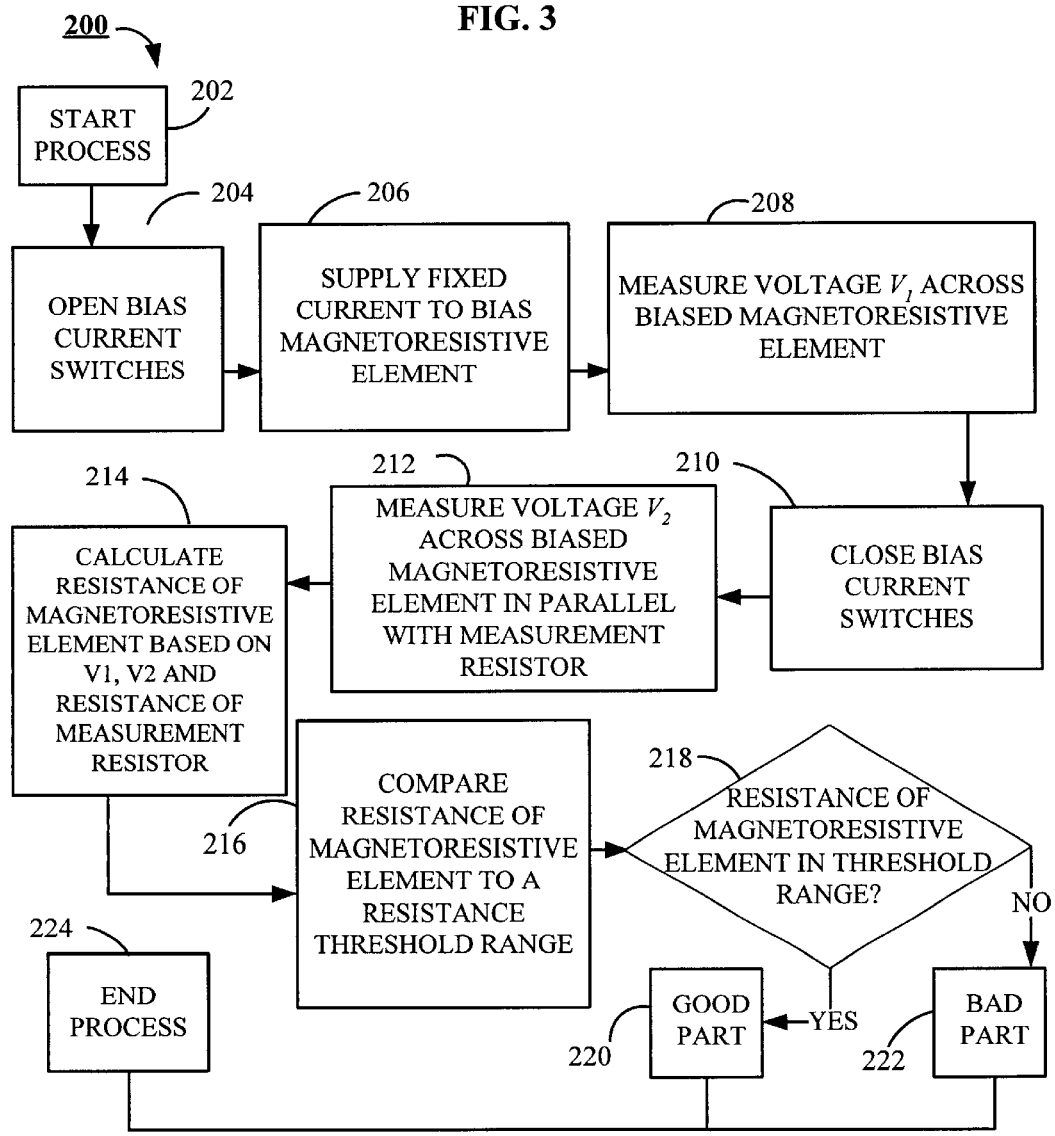
FIG. 4 is a flow chart of a resistance measurement method for measuring the resistance of the magnetoresistive element of FIG. 1.

FIG. 4 shows steps for a resistance measurement process 200 used in selecting a read/write head (such as 118) for use in a disc drive (such as 100) based on resistance of a magnetoresistive element (such as 158). The resistance measurement process begins at start process step 202 and continuing at process step 204 with an opening of at least one bias current switch (such as 152) to isolate a measurement resistor (such as 154) from the magnetoresistive element of the read/write head included in the measurement circuit 150. (In another embodiment, one bias current bypass switch 172 is toggled to measure the resistance of the measurement resistor and the resistance of the magnetoresistive element of the read/write head included in the measurement circuit 170). The resistance measurement process 200 continues at process step 206 with an application of a fixed current across the magnetoresistive element. The fixed current is provided by a bias current source (such as 160). At process step 208, an analogue voltage detector (such as 156) measures a first voltage, $V_1$, across the magnetoresistive element. Each open bias current switch is closed and the measurement resistor is switched into the measurement circuit in parallel with the magnetoresistive element at process step 210. The resistance measurement process 200 continues at process step 212 with the analogue voltage detector measurement of a second voltage, $V_2$, across the magnetoresistive element in parallel electrical communication with the measurement resistor. (In another embodiment, a second voltage, $V_2$, across the measurement resistor is measured). At process step 214, $V_1$, $V_2$, and the resistance R, of the measurement resistor are factored together to determine the resistance of the magnetoresistive element. At process step 216, a comparison is made between the determined resistance of the magnetoresistive element an a pre-determined resistance threshold range is made and at process step 218 a determination of whether the read/write head is a good part, shown at process step 220, or a bad part, shown at process step 222, is made. The resistance measurement process 200 concludes at end process step 224.

Although design parameters for the magnetoresistive element dictate the structure and composition of the magnetoresistive element, which dictates the level of resistance present in the element, the predetermined resistance threshold is empirically determined for each specific disc drive 100 of a particular configuration. The resistance level, or range of acceptable resistance within which a particular magnetoresistive element of a specific read/write head 118 configuration may have depends on the structure, composition and production variables encountered by the magnetoresistive element during the manufacturing process. An example of a typical acceptable resistance range for a magnetoresistive element of a particular structure, composition and set of production variables is in the range of 30 to 90 Ohms.

Generally, read performance data of a particularly configured read/write head 118 are collected over a sample of read/write heads 118. The desired read performance, typically including a margin of safety, is determined. The attributes, including the resistance of the magnetoresistive element, of the read/write heads from the sample that delivered the desired performance are measured and cataloged to serve as a base for development of manufacturing test, measurement and statistical process control systems.

Accordingly, embodiments of the present invention are directed to a resistance measurement circuit (such as 150) used in determining resistance of a magnetoresistive element (such as 158) of a read/write head (such as 118) of a disc drive (such as 100). In accordance with one embodiment, in addition to the magnetoresistive element, the resistance measurement circuit includes at least one bias current switch (such as 152) used to switch in and switch out a measurement resistor (such as 154) from the measurement circuit while voltage measurements are made by an analogue voltage detector (such as 156). Also included in the resistance measurement circuit is a current source (such as 160), which provides a fixed current to the magnetoresistive elements and the measurement resistor during execution of voltage measurements.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method for determining an operative state of a magnetoresistive element comprising steps of:
    measuring a first voltage across a biased magnetorestive element;
    activating a component for communication with the biased magnetorestive element;
    measuring a second voltage across the component communicating with the biased magnetorestive element;
    determining a resistance of the magnetoresistive element based on the first and second voltage measurements; and
    comparing the determined resistance of the magnetoresistive element to a predetermined resistance threshold to determine the operative state of the magnetoresistive element.

2. The method of claim 1, further comprising steps of:
    providing a bias current for biasing the magnetoresistive element; and
    biasing the magnetoresistive element with the bias current.

3. The method of claim 1, in which the component of the activating step is activated by enabling a switch to engage the component in an electrical parallel configuration with the biased magnetoresistive element.

4. The method of claim 1, in which the predetermined resistance threshold of the comparing step is a predetermined range of resistance values.

5. The method of claim 4, in which the determined resistance of the magnetoresistive element predetermined resistance falls within the predetermined range of resistance values, the magnetoresistive element is in an operative state.

6. The method of claim 4, in which the determined resistance of the magnetoresistive element predetermined resistance falls outside the predetermined range of resistance values, the magnetoresistive element is in a non-operative state.

7. The method of claim 2, in which the bias current is a fixed current supplied by a bias current source.

8. The method of claim 3, in which the component is a measurement resistor of predetermined value.

9. The method of claim 8, in which the resistance of the magnetoresistive element of the determining step is further based on a resistance value of the measurement resistor.

10. The method of claim 9, in which the resistance of the magnetoresistive element of the determining step is determined by a ratio of the measured voltages factored by a value of the resistance of the measurement resistor.

11. The method of claim 9, in which the measurement resistor is a 1000 Ohm resistor.

12. A magnetoresistive element measurement circuit comprising:
    a magnetoresistive element; and
    a current bypass switch controllingly engaging a measurement resistor in an electrical parallel configuration with the biased magnetoresistive element.

13. The magnetoresistive element measurement circuit of claim 12 further comprises a bias current source biasing the magnetoresistive element with a fixed bias current.

14. The magnetoresistive element measurement circuit of claim 13 further comprises an analogue voltage detector measuring voltage across the biased magnetoresistive element.

15. The magnetoresistive element measurement circuit of claim 12, in which the current bypass switch controllingly engaging the measurement resistor in electrical parallel communication with the biased magnetoresistive element, and further comprises a bias current source providing a fixed bias current to the measurement resistor while biasing the magnetoresistive element with the fixed bias current.

16. The magnetoresistive element measurement circuit of claim 15 further comprises an analogue voltage detector measuring voltage across the biased magnetoresistive element with the measurement resistor in electrical parallel communication with the biased magnetoresistive element.

17. The magnetoresistive element measurement circuit of claim 12, in which the current bypass switch is a pair of current bypass switches.

18. The magnetoresistive element measurement circuit of claim 12 further comprising:
    a bias current source biasing the magnetoresistive element with a fixed bias current; and
    an analogue voltage detector measuring voltage across the biased magnetoresistive element.

19. The magnetoresistive element measurement circuit of claim 18, in which the current bypass switch is a pair of current bypass switches.

* * * * *